R. WHITTIER.
Cant-Hooks.
No. 141,906.  Patented August 19, 1873.
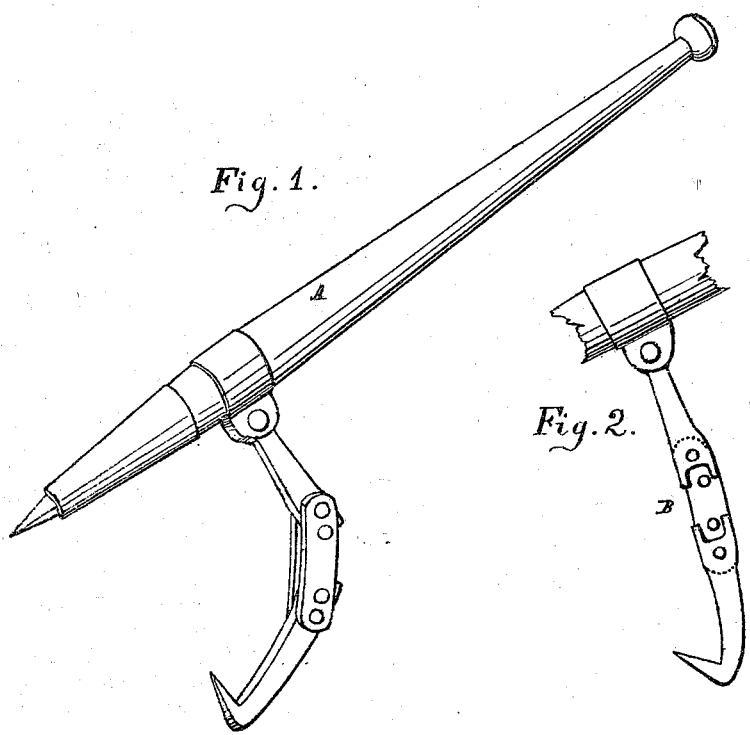
Witnesses:
Inventor.

UNITED STATES PATENT OFFICE.

REUBEN WHITTIER, OF OSHKOSH, WISCONSIN, ASSIGNOR OF ONE-HALF HIS RIGHT TO RICHARD HACKETT, OF SAME PLACE.

IMPROVEMENT IN CANT-HOOKS.

Specification forming part of Letters Patent No. 141,906, dated August 19, 1873; application filed February 1, 1872.

*To all whom it may concern:*

Be it known that I, REUBEN WHITTIER, of the city of Oshkosh, Wisconsin, have invented a new and useful Improvement in Cant-Hooks for Rolling Logs and Timber, of which the following is a true and full description:

My invention relates to a flexible cant-hook; the object being the construction of a cant-hook that shall be equally efficient in rolling either small or large logs.

Figure 1 represents the hook attached to the lever as it appears when it is ready to be used. Fig. 2 represents the hook with one-half of the middle section removed, showing the method of forming the joints.

A represents the wooden lever to which the iron hook is attached, which may be made of such dimensions and proportions as experience has demonstrated to be the most convenient and efficient. B represents the jointed hook, which is constructed with joints made in the manner represented by the drawing.

Having described my invention, what I wish to secure by Letters Patent is—

The flexible cant-hook B, when constructed with joints having a limited movement, substantially as shown and described.

REUBEN WHITTIER.

Witnesses:
BENJAMIN GARVIN,
R. H. BOYNTON.